United States Patent [19]

Kennedy

[11] Patent Number: 5,383,495
[45] Date of Patent: Jan. 24, 1995

[54] STAINLESS STEEL SECURITY CAP FOR FIRE HYDRANTS

[75] Inventor: Paul G. Kennedy, Horseheads, N.Y.

[73] Assignee: Penn Troy Machine Co., Inc., Troy, Pa.

[21] Appl. No.: 50,846

[22] Filed: Jun. 21, 1993

[51] Int. Cl.⁶ .......................... F16L 55/10; E03B 9/06
[52] U.S. Cl. .................... 138/89; 138/96 T; 137/296
[58] Field of Search .............. 138/89, 96 R, 96 T; 137/296, 800

[56] References Cited

U.S. PATENT DOCUMENTS

| | | | |
|---|---|---|---|
| 3,814,135 | 6/1974 | Helzer et al. | 138/96 T |
| 3,929,152 | 12/1975 | Graham | 137/296 |
| 3,935,877 | 2/1976 | Franceschi | 137/296 |
| 3,963,054 | 6/1976 | Martin | 138/89 |
| 4,141,574 | 2/1979 | Stansifer et al. | 137/296 |
| 4,356,839 | 11/1982 | Voynovich | 137/296 |
| 4,566,481 | 1/1986 | Leopold et al. | 137/296 |
| 4,651,771 | 3/1987 | Borenstein et al. | 137/296 |
| 4,727,900 | 3/1988 | Dooling et al. | 137/296 |
| 5,033,501 | 7/1991 | Stehling | 137/296 |

FOREIGN PATENT DOCUMENTS 2204100 11/1988 United Kingdom ................ 137/296

*Primary Examiner*—James E. Bryant, III
*Attorney, Agent, or Firm*—Barnard, Brown & Michaels

[57] ABSTRACT

A security hydrant cap having a domed body adapted to be removed only with a specialized tool, and a slip ring surrounding substantially all of the body and mounted thereto so as to be free to rotate about the body. The slip ring and, preferably, the body are formed of stainless steel. Preferably, the slip ring and body are made of a 400 series stainless steel, heat treated to a Rockwell "C" hardness of approximately 43-47.

8 Claims, 1 Drawing Sheet

STAINLESS STEEL SECURITY CAP FOR FIRE HYDRANTS

FIELD OF THE INVENTION

The invention pertains to the field of protective caps for fire hydrants. More particularly, the invention pertains to improved fire hydrant caps of the kind requiring a special wrench to mate with specific recesses in a cap, and having a slip ring surrounding the cap to prevent the use of a strap wrench to remove the cap.

BACKGROUND OF THE INVENTION

Fire hydrants are used in virtually every community in the country to allow fire fighting apparatus to obtain a water supply for fighting fires. Unfortunately, traditional hydrant designs were all too easy to operate by unauthorized users such as children wishing to play in the water, illicit water-suppliers, and simple vandals wasting water for no particular reason.

As many areas become increasingly sensitive to the loss of water from the municipal system, various protection methods evolved to make it harder for unauthorized users to access hydrants.

One design which has proven important commercially is the cap patented in Graham, U.S. Pat. No. 3,929,152, assigned to Hydra-Shield Manufacturing, Inc. This design used a domed cap with a plurality of grooves which required a special wrench having a gripping portion with shoulders for engaging the grooves. As this design became widely used, however, vandals learned that the cap could be removed using a strap wrench, defeating the security.

Over a period of years the Graham design was modified to include a slip ring concentrically located around the cap. If a vandal attempted to remove the cap with a strap wrench, he could only rotate the slip ring around the cap, without loosening the cap. As the modified cap became common over time, vandals learned that it, too, could be defeated by simply hitting the slip ring with a hammer until it was bent and would no longer rotate, at which point a strap wrench would once again suffice to remove the cap.

Although this modification to Graham was not patented, to the best of the present inventor's knowledge, Franceschi, U.S. Pat. No. 3,935,877 shows the use of a basically identical slip ring arrangement (called a "Saturn Ring" in that patent) secured to a cap by a snap ring to prevent turning of a hydrant valve. The Franceschi patent also shows an alternative to the Graham grooves, in that the cap has a plurality of gripping surfaces around the domed cap, which are adapted to mate with the matching specialized wrench.

In order to prevent the deformation of the slip ring design, which problem had become obvious over the years of use, Hydra-Shield modified the design to use a forged carbon steel material for the cap and the slip ring, heat treated to a Rockwell "C" hardness at least in the range of 50–62 (the specification calls for a preferred range of 58–62, to a depth of 0.03"). This was patented as Stehling, U.S. Pat. No. 5,033,501.

Stehling was an improvement over the modified Graham cap, in that the heat treated carbon steel hardened slip ring makes it more difficult to deform the slip ring and thus fuse it to the cap. However, the carbon steel required by the Stehling patent is prone to corrosion, which necessitated making provision for the injection of lubricant between the slip ring and the cap (see Stehling, column 4, line 61, to column 5, line 9). In practice, however, fire hydrant caps rarely if ever receive the maintenance attention needed to periodically inject lubricant into the caps. As years pass, the slip rings eventually corrode under the influence of the weather until they fuse to the cap, and the purpose of the slip ring is thus defeated.

Also, the heat treating of the carbon steel results in the specified hardness only on the surface of the slip ring (to a depth of 0.03" according to the specification of the patent).

SUMMARY OF THE INVENTION

The invention comprises an improved fire hydrant cap of the kind having a domed cap and a rotating slip ring around the periphery of the cap to prevent unauthorized use of the hydrant, in which the improvement comprises the utilization of a cap and slip ring arrangement made of stainless steel.

DESCRIPTION OF THE PREFERRED EMBODIMENT

Figure 1:
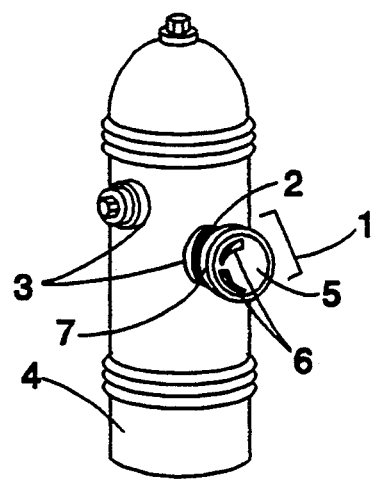
FIG. 1 shows perspective view showing the fire hydrant cap of the invention, as it would appear in place on a hydrant.

Referring to FIG. 1, the cap of the invention (1) is threaded onto the external threads (2) of an outlet (3) of a fire hydrant (4). Typically, hydrants will have anywhere from one to four water outlets, sometimes of various sizes depending on the hose to be attached. It will be understood by one skilled in the art that the cap of the invention can be sized to fit any size outlet threads, without departing from the teachings of the invention. Also, with a simple modification to the attachment means, the invention could be used as a hydrant valve cap similar to Franceschi, in addition to the Graham-type hydrant outlet use shown.

The cap (1) externally comprises a domed central portion (5) which has a circumferential pattern of grooves (6), designed to cooperate with an appropriately shaped wrench (not shown). Although the grooves shown in the figure are those of the Graham patent (3,929,152), it will be understood by one skilled in the art that any cap design can be used within the teachings of the invention, so long as an appropriately shaped wrench is supplied to interact with them. For example, the multiple gripping surface shape used by Franceschi could be incorporated within the teachings of the invention.

A cylindrical slip ring (7) concentrically surrounds the base of the domed central portion (5), such that any strap wrench wrapped around the cap must contact either the slip ring (7) or the domed central portion (5) (from which it will slip due to the domed design).

Figure 2:
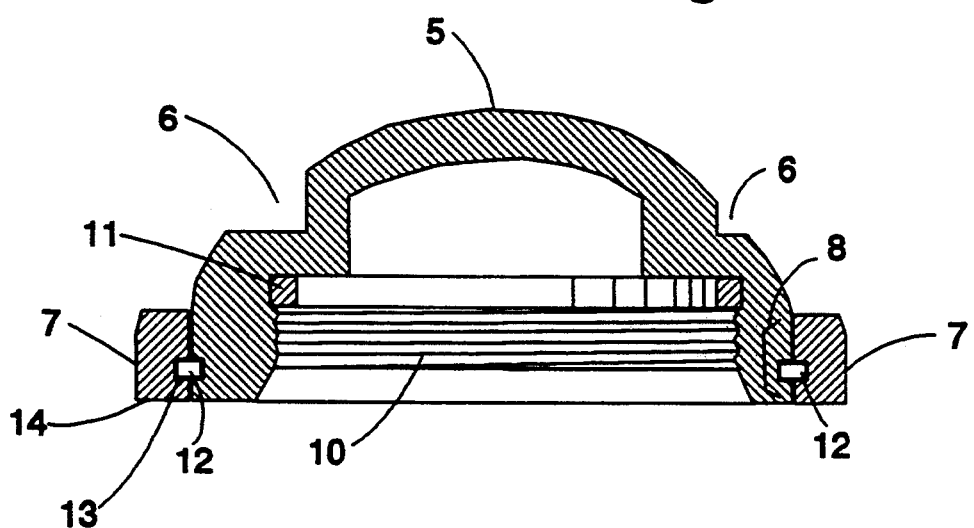
FIG. 2 shows a cut-away view of the cap of the invention.

FIG. 2 shows a cut-away view of the cap of the invention. As in FIG. 1, the major parts of the cap are the domed central portion (5) and the slip ring (7). Two grooves (6), similar to those in the Graham patent, are shown in this figure. The central portion is externally domed, with a cylindrical base (8) provided with an inner cavity (9) having threads (10) which are of appropriate diameter and threading to mate with the hydrant outlet to be covered. Preferably, seated within the cavity is a lock washer (11) which acts as a seal as the cap is tightened on the hydrant outlet. This lock washer is preferably a split steel ring, preferably zinc coated to minimize corrosion effects.

The outside of the cylindrical base portion (8) of the domed center (5) is grooved (13) to accept a split snap ring (12). The inner surface of the slip ring (7) has a matching groove (14). In assembly, the snap ring (12) is compressed into the groove (13) on the base portion, and the slip ring is slipped over the base portion. When the two grooves are aligned, the snap ring locks into the groove (14) in the slip ring, locking the slip ring and the domed center of the cap together while allowing free rotation of the slip ring around the domed central portion of the cap. It will be understood by one skilled in the art that other means of rotatably attaching the slip ring to the domed cap are possible within the teachings of the invention, such as roller or ball bearings threaded or press-fit into the parts, etc.

In order to render the slip ring impervious to both deformation due to vandalization and fusion due to corrosion, at least the slip ring, and preferably both the slip ring and the domed central portion of the cap, are made of stainless steel. This is preferably 400 series stainless steel, machined and heat treated to a Rockwell "C" hardness of approximately 43–47. Alternatively, the slip ring (and, preferably domed portion) could be made of a 300 series stainless steel, which would not be heat treated at all, with some loss in vandal resistance.

This use of stainless steel results in a stronger, more damage-resistant cap. In contrast to the 8620 carbon steel of the Stehling patent (5,033,501), the 400 series stainless steel has a lower maximum Rockwell "C" hardness, below the range required by that patent (58–62). This lower hardness, however, is a "through" hardness rather than the surface or case hardening (0.03") of the carbon steel. The core tensile strength of the stainless is approximately 212 PSI max, as opposed to the approximately 190 PSI max of the forged carbon steel.

In addition, stainless steel is significantly more corrosion-resistant than the carbon steel of the prior art. This results in the cap of the invention being much more resistant to the lack of maintenance experienced under real-world conditions. Thus, the slip ring of the invention is much less likely to fuse to the central portion of the cap due to corrosion effects.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

I claim:

1. A security hydrant cap for a fire hydrant outlet being mounted to and removed from the hydrant outlet by a specialized tool, the cap comprising:
   a) a generally cylindrical central body portion having inner and outer ends and a cylindrical body therebetween;
   b) the outer end of the central body portion having a domed surface with a plurality of grooves adapted to mate with the specialized tool for removal of the cap thereby;
   c) the inner end of the central body portion having a threaded cavity axially centered on the axis of the central body portion, the diameter and threading of the cavity being adapted to mount onto the hydrant outlet;
   d) a cylindrical slip ring having an inner diameter larger than the outer diameter of the cylindrical body, and a width at least equal to the width of the cylindrical body, whereby the slip ring is adapted to slide over the cylindrical body and cover substantially all of the cylindrical body,
   e) means for rotatably securing the slip ring to the cylindrical body, whereby the slip ring and the cylindrical body are locked together along the axis of the cylinder, while the slip ring remains free to rotate about the axis;
   f) the slip ring being made of stainless steel.

2. The security cap of claim 1 in which the central body portion is made of 400 series stainless steel.

3. The security cap of claim 2 in which the central body portion is made of stainless steel heat treated to a Rockwell "C" hardness in the range of 43–47.

4. The security cap of claim 1 further comprising a lock washer for sealing the cap against the hydrant outlet, located within the threaded cavity of the central body portion.

5. The security cap of claim 4 in which the lock washer is zinc-plated steel.

6. The security cap of claim 1 in which
   a) the outer surface of the cylindrical body has a groove extending around substantially all of the circumference of the cylindrical body;
   b) the inner surface of the slip ring has a groove extending around substantially all of the circumference of the slip ring;
   c) the means for securing the slip ring to the cylindrical body comprises a spring steel snap ring having a compressed diameter small enough to fit within the groove in the cylindrical body, such that the slip ring may be slid over the cylindrical body with the snap ring in the groove thereon, and an uncompressed diameter sufficient to snap into the groove in the slip ring while still engaging the groove in the cylindrical body.

7. The security cap of claim 1 in which the slip ring is made of 400 series stainless steel.

8. The security cap of claim 7 in which the slip ring is heat treated to a Rockwell "C" hardness in the range of 43–47.

* * * * *